US006210565B1

(12) United States Patent
Evans

(10) Patent No.: US 6,210,565 B1
(45) Date of Patent: Apr. 3, 2001

(54) HYDRAULIC FILTER HEAD-MOUNTED FLOWMETER

(76) Inventor: Robert E. Evans, 103 Colonial Ct., LaGrange, GA (US) 30240

( * ) Notice: Subject to any disclaimer, the term of this patent is extended or adjusted under 35 U.S.C. 154(b) by 0 days.

(21) Appl. No.: 09/161,180

(22) Filed: Sep. 25, 1998

(51) Int. Cl.[7] ..................................................... B01D 17/12
(52) U.S. Cl. ........................... 210/87; 73/861.54; 210/94; 210/444
(58) Field of Search ................................. 210/85, 90, 87, 210/444, 94; 73/861.47, 861.54, 861.71

(56) References Cited

U.S. PATENT DOCUMENTS

| | | |
|---|---|---|
| 1,068,926 | 7/1913 | Popoff . |
| 2,069,309 | 2/1937 | Henszey . |
| 3,408,865 * | 11/1968 | Chenault ............................ 73/861.54 |
| 4,315,436 | 2/1982 | McCabe et al. . |
| 4,466,293 * | 8/1984 | Huhtala ............................ 73/861.54 |
| 4,507,976 | 4/1985 | Banko . |
| 4,934,187 | 6/1990 | Woltman . |
| 5,085,076 | 2/1992 | Engelmann . |
| 5,131,277 | 7/1992 | Birdsong et al. . |
| 5,827,978 * | 10/1998 | Kadlicko ............................ 73/861.54 |
| 5,922,199 * | 7/1999 | Hodgkins ............................ 210/444 |
| 6,068,762 * | 5/2000 | Stone et al. ............................ 210/444 |

OTHER PUBLICATIONS

Hedland, Form No. 224, "IR–OPFLOW Flow Meter with InfraRed Optical–Electric Signal Pick Up" (Sep., 1989).
Webster Instruments, Advertising Brochure, "Quality Hydraulic Testing Equipment" (May, 1994).
Flowdata, Inc., Flyer CAT–CON–1092, "Flow–Thru Guarantee" (1992).
Flo–Tech, Inc., Flyer, Bi–directional Measurement of Flow, Pressure and Temperature (date unknown).

* cited by examiner

Primary Examiner—Joseph W. Drodge
(74) Attorney, Agent, or Firm—Needle & Rosenberg, P.C.

(57) ABSTRACT

A device and method for monitoring a fluid characteristic, such as flowrate, of a fluid within a fluid circuit having a preexisting filter head. The device is installed on the filter head in place of the existing filter element. The apparatus includes a housing having an internal surface defining an interior volume, a coupling for connecting the housing to the filter head and a flow indicator or other fluid responsive device actuated by flow of the fluid through the device. The fluid characteristic is monitored by observation of the fluid responsive component.

9 Claims, 6 Drawing Sheets

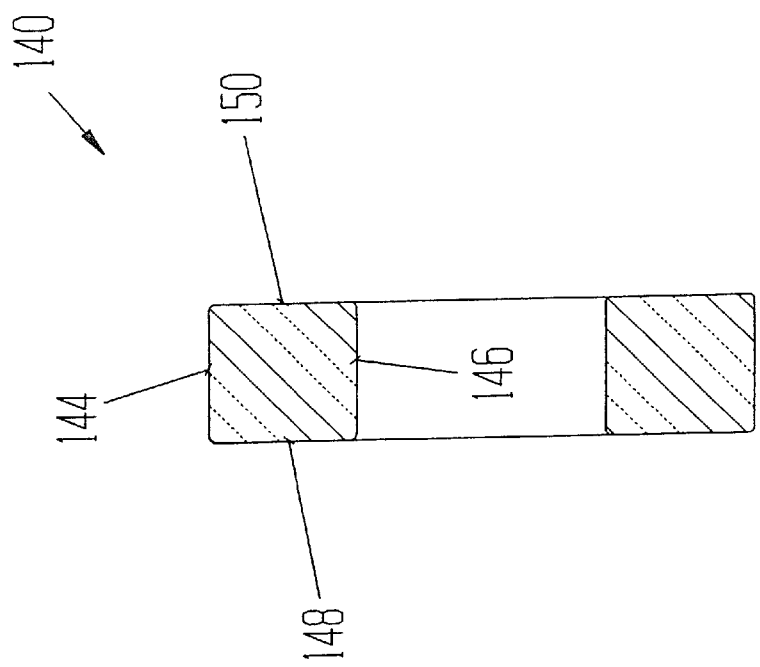
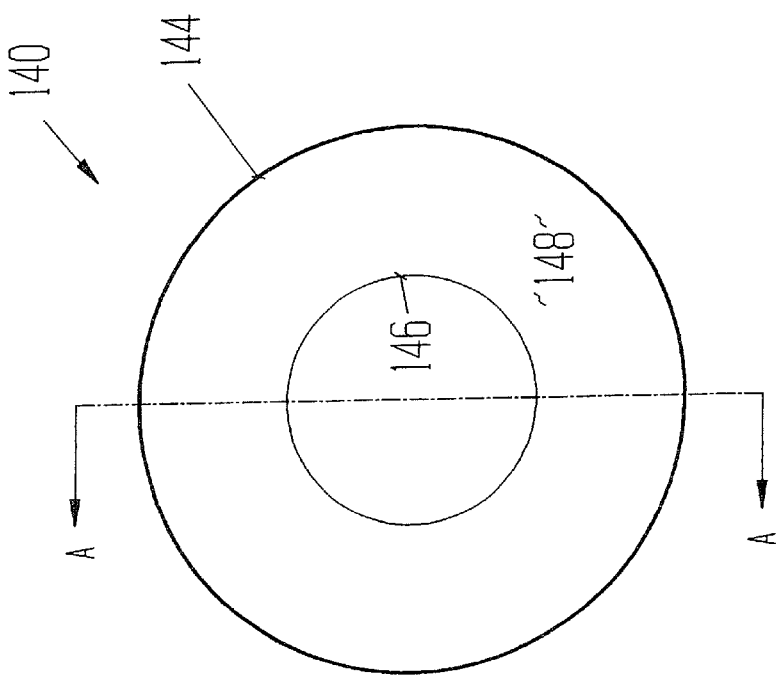

HYDRAULIC FILTER HEAD-MOUNTED FLOWMETER

BACKGROUND OF THE INVENTION

1. Field of the Invention

The present invention relates generally to fluid flow monitoring and measurement, and more specifically to a flowmeter apparatus for connection to a preexisting fitting in a fluid circuit such as a filter head, and a method of flow measurement utilizing such an apparatus.

2. Description of Related Art

Pressurized fluid delivery systems find application in a number of fields for a wide variety of purposes. For example, hydraulic power transmission systems transmit power through a pressurized working fluid, typically a petroleum-based or fire-resistant water based or synthetic liquid, within a fluid circuit comprising a fluid conduit such as pipe, tubing, or hose. These systems can be stationary, or can be mobile, such as a vehicle-mounted hydraulic system. Examples of hydraulic power transmission systems include, without limitation: systems for raising and lowering rail wheels on bi-modal (i.e., having rubber tires for road transport and steel wheels for rail transport) vehicles; load lifting power systems on forklifts, earth-moving machinery, and other heavy equipment; brake and steering systems on vehicles including automobiles and trucks; vehicle lifts; and other fluid power systems.

Pressurized fluid delivery systems are also common in a number of other applications, in addition to power transmission systems. For example, lubricating oil in automotive and other types of engines and drive systems is distributed under pressure via a fluid circuit. Likewise, fuel and cooling water systems in engines utilize pressurized fluid delivery circuits. Drinking water and natural gas are also distributed to points of use under pressure through fluid delivery circuits. The working fluid or delivered fluid distributed through a pressurized fluid delivery system can be a liquid or a gas. For example, in addition to liquids such as the above-described hydraulic fluids and oils, pressurized air or other gas is used as the working fluid in pneumatic power systems, and pressurized air or other gas are distributed by breathing air systems and other gas delivery systems.

One feature common to many pressurized fluid circuits is the provision of one or more filtering devices for removal of contaminants from the fluid. For example, hydraulic power systems typically include an inline filter in the return flow line to remove any particulate matter prior to recirculating through the pump. Other examples include oil filters in automotive lubrication systems, charcoal filters in drinking water delivery systems, and HEAP filters in air delivery systems, to name but a few. Because the filter elements of filtering devices must be periodically replaced or cleaned, fluid circuits commonly include a detachable connection point, or "filter head," where the filter element is installed. In most instances, these filter heads are provided in readily accessible locations in the fluid circuit, and valving or other shut-off devices are provided as necessary to prevent or minimize fluid escape upon removal of the filter element.

It has been found desirable, for a number of reasons, to monitor the flow characteristics of fluid flow within a fluid circuit. For example in troubleshooting, maintenance and repair of the fluid circuit and related equipment, it is often helpful to measure the pressure or flowrate of a fluid flow at one or more locations in an existing fluid circuit. Likewise, for quality control purposes, it is often desired to test a new fluid circuit by measuring the pressure or flowrate of a fluid flow at one or more locations in the circuit. A variety of flow monitoring devices have previously been developed, but have been found to be less than fully satisfactory for many applications. For example, previously known inline flowmeters typically require that sections of the fluid circuit be disconnected to permit installation of the flowmeter. Removal of the flowmeter then requires another disconnection of the circuit. This can be time consuming and expensive, and can result in considerable loss of fluid from the circuit. Previously known external flowmeters using ultrasound or other non-invasive means for measuring flowrates in a circuit are often expensive, difficult to operate, less accurate than inline flowmeters, and may be limited to application with certain conduit materials.

Thus it can be seen that a need yet exists for an apparatus capable of monitoring the flow characteristics of a fluid through a fluid circuit, which apparatus can be easily and inexpensively installed, used and removed. A need also exists for a method of monitoring flow characteristics in a fluid circuit using such a device. It is to the provision of an apparatus and method meeting these and other needs that the present invention is primarily directed.

SUMMARY OF THE INVENTION

Briefly described, in preferred form, the present invention advantageously utilizes the filter heads provided in many fluid circuits as a point of installation for an apparatus for monitoring a fluid characteristic. The apparatus includes monitoring means for monitoring a fluid characteristic, the monitoring means preferably comprising a flowmeter. Alternate embodiments may comprise one or more other or additional monitoring means for monitoring a fluid characteristic, such as, for example, a pressure gauge, a flow direction indicator, a temperature sensor, and/or a pH meter. The apparatus preferably further comprises a coupling for releasably connecting the monitoring means to a filter head. The apparatus can be easily and inexpensively installed and removed on an existing filter head in the fluid circuit. Because the filter heads are typically provided at readily accessible locations in the fluid circuit, and also are typically provided with easily detached and reattached couplings, an existing filter element can be removed and the monitoring apparatus installed in its place. Once the desired flow monitoring is complete, the monitor is removed and the filter element is re-installed. Valving or other flow control devices are typically already in place at the filter head, so that fluid release during installation and removal of the monitor is minimized or eliminated.

One aspect of the invention provides an apparatus for measuring a fluid flowrate through a fluid circuit with a filter head. The apparatus preferably includes a housing having an internal surface defining an interior volume. The apparatus preferably further comprises a coupling for connecting the housing to the filter head, the coupling having an inlet for communicating a fluid inflow from the fluid circuit to the interior volume, and an outlet for communicating a fluid discharge from the interior volume to the fluid circuit. The apparatus preferably further comprises a flow indicator movable within the housing in response to the fluid flowrate through the fluid circuit.

In another aspect, the present invention comprises an apparatus for indicating a rate of flow of a fluid through a fluid circuit, the fluid circuit including a filter head, a fluid supply to the filter head and a fluid discharge from the filter head. The apparatus preferably includes a coupling adapted to releasably engage at least a portion of the filter head. The coupling preferably includes an inlet for receiving fluid from the fluid supply, and an outlet for discharging fluid to the fluid discharge. The apparatus preferably also includes a housing having a first end, a second end, and at least one wall portion extending between the first and second ends. The first and second ends and the wall portion define an interior volume. The first end is attached to the coupling, and the second end comprises a closed floor portion. The apparatus preferably also includes a fluid conduit extending through at least a portion of the housing, and having a first opening in communication with the outlet and a second opening extending lengthwise along the fluid conduit. The apparatus preferably also includes a flow indicator movable within the housing in response to the rate of flow of a fluid through the fluid circuit.

In another aspect, the present invention comprises a flowmeter for measuring a fluid flowrate through a fluid circuit. The flowmeter preferably includes a housing comprising a first end, a second end, and a wall portion extending between the first and the second ends, and defining an interior volume therein. An inlet communicates a fluid inflow to the interior volume, and an outlet communicates a fluid discharge from the interior volume. The flowmeter preferably also includes a fluid conduit having a first opening in communication with the outlet, and a second opening in communication with the interior volume. A flow indicator movable within said interior volume in response to the fluid inflow is also preferably provided, whereby movement of the flow indicator in response to increasing flow rate exposes a progressively larger portion of the second opening to fluid flow therethrough.

In another aspect, the present invention comprises a method of monitoring a characteristic of a fluid within a fluid circuit having a filter head, utilizing an apparatus substantially as described above. The method preferably comprises providing a monitoring means for monitoring a characteristic of a fluid within a fluid circuit, and a coupling for releasably connecting the monitoring means to the filter head. The method preferably further comprises connecting the coupling to the filter head, and monitoring the characteristic of the fluid by observation of the monitoring means.

These and other features and advantages of preferred forms of the present invention are described herein with reference to the drawing figures.

BRIEF DESCRIPTION OF THE DRAWING FIGURES

FIG. 6A shows a top view of a flow indicator portion of the apparatus of the present invention, according to a preferred form.

FIG. 6B shows a side view, in cross-section, of a flow indicator portion of the apparatus of the present invention, according to a preferred form.

DETAILED DESCRIPTION

Figure 1:
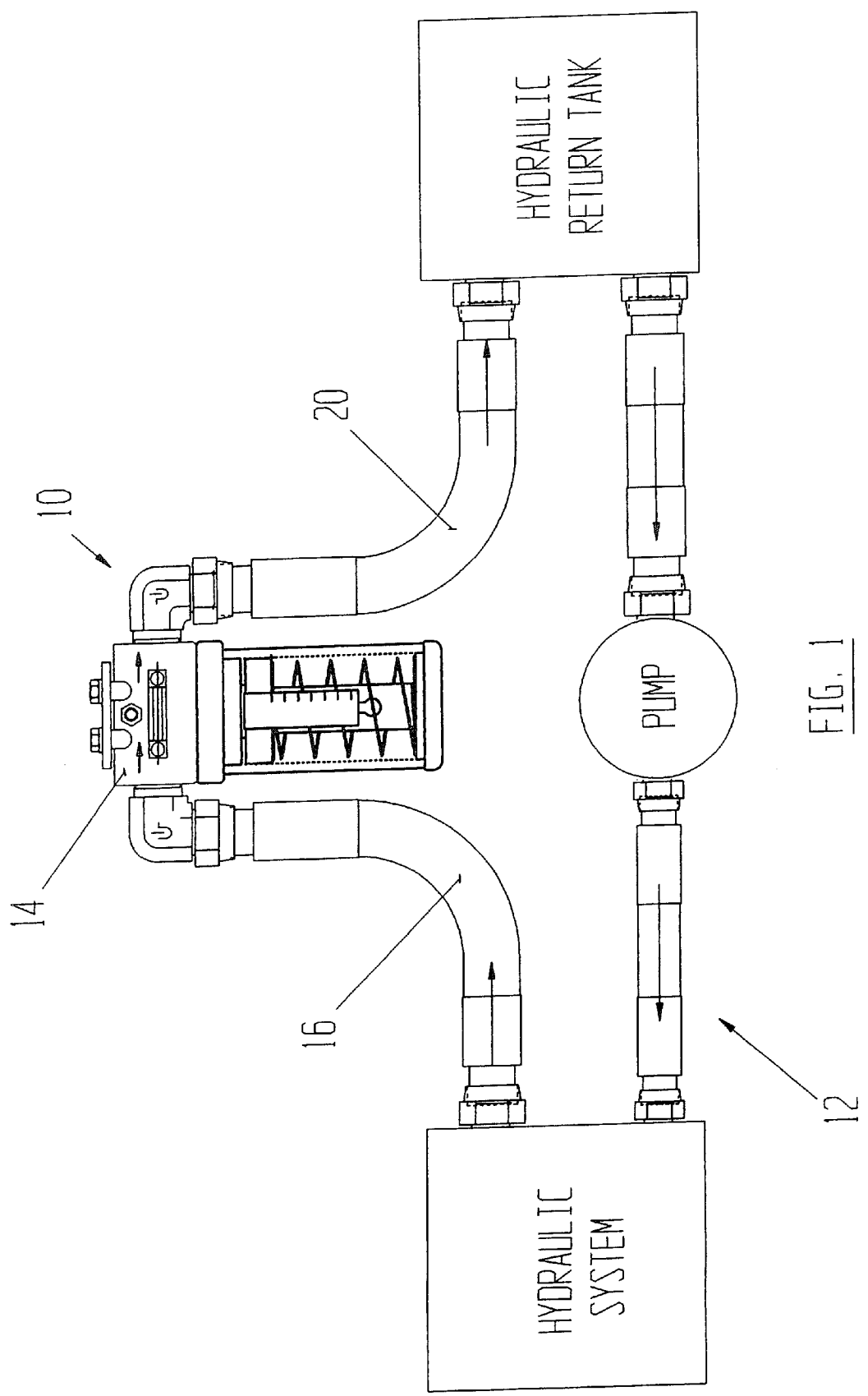
FIG. 1 shows a flow monitoring apparatus according to a preferred form of the present invention in a hydraulic circuit.
Figure 2:
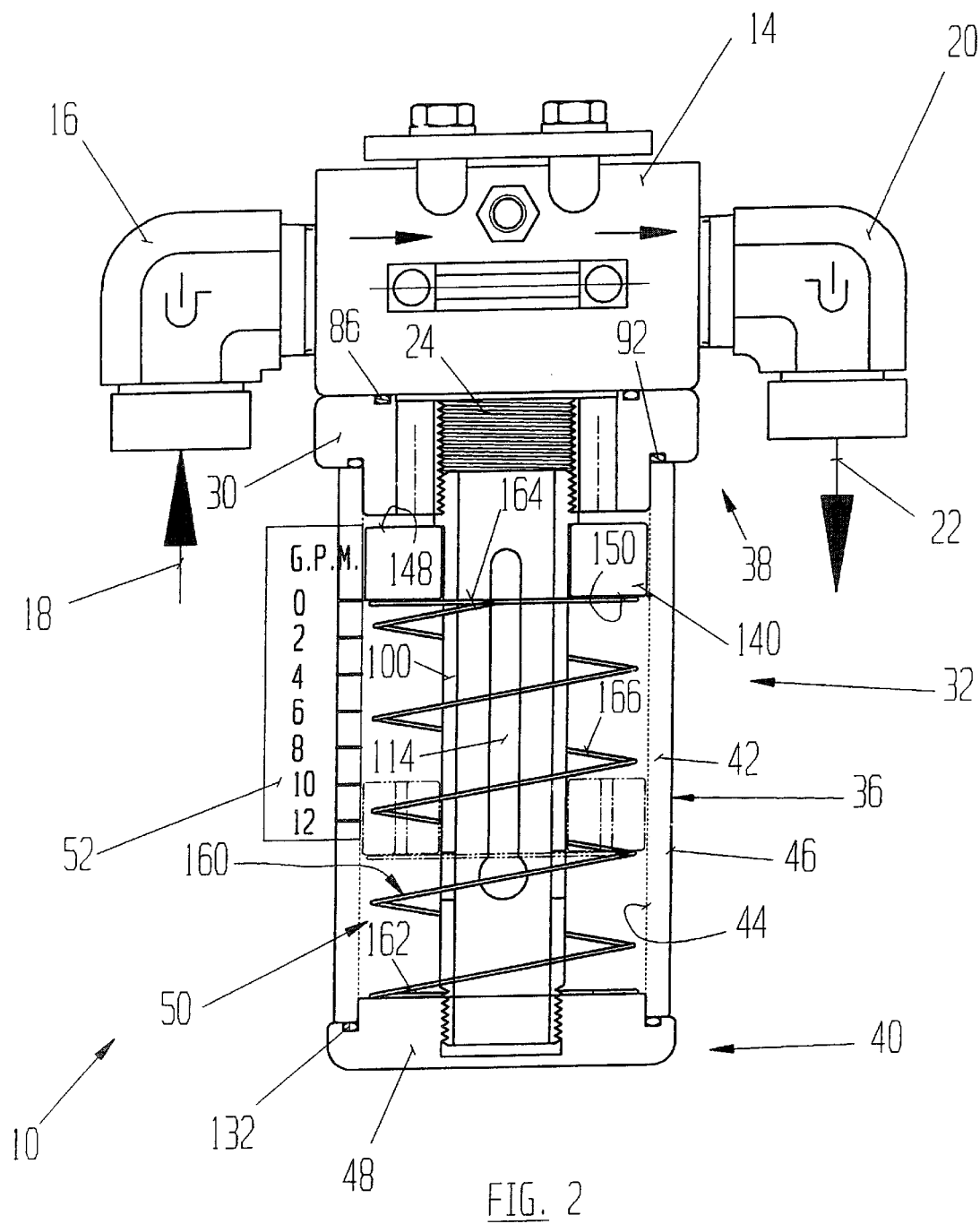
FIG. 2 shows a side view, in partial cross-section, of a flow monitoring apparatus according to a preferred form of the present invention.

Referring now to the drawing figures, wherein like reference numerals represent like parts throughout, preferred forms of the present invention will now be described. FIGS. 1 and 2 show an apparatus 10 for monitoring a fluid characteristic within a fluid circuit 12. The fluid circuit 12 typically will include a filter head 14, a fluid supply conduit 16 for supplying a fluid inflow 18 to the filter head 14, and a fluid discharge conduit 20 for discharging a fluid discharge 22 from the filter head 14. The filter head 14 will typically include a threaded nipple 24, or other coupling element for attaching a replaceable filter element (unshown). The filter head 14 typically includes segregated inlet and outlet orifices for delivering the fluid inflow 18 to the filter element and receiving the fluid discharge 22 from the filter head. In the variety of filter head 14 depicted in the figures, the threaded nipple 24 serves to segregate the inlet and outlet orifices, the outlet orifice comprising a bore within the nipple 24, and the inlet orifice comprising a plenum about the outer circumference of the nipple 24. In nonnal use, the replaceable filter element comprises one or more layers of paper, polypropylene, or other filter media permeable to the fluid, but not passing contaminants or other undesired materials. The filter element is interposed between the fluid inflow 18 and the fluid discharge 22, so that all fluid circulating through the filter head passes through the filter media, thereby removing any undesired contaminants from the fluid. The filter element will eventually become clogged with contaminants removed from the fluid, and therefore, must periodically be cleaned or replaced. To facilitate removal and replacement of the filter element for replacement or cleaning, detachable coupling means for releasably connecting the filter element to the filter head 14 are typically provided. The detachable coupling means can comprise a threaded nipple, as depicted in the figures, and a corresponding threaded orifice in the filter element, a twist-lock connection, threaded connectors, clips, or other releasable connection devices.

As will be understood best with reference to FIG. 2, the filter element is removed from the filter head 14 and, in its place, an apparatus 10 for monitoring a fluid characteristic is attached to the detachable coupling means of the filter head 14. In the preferred embodiment depicted in the figures, the apparatus 10 generally comprises a coupling portion 30 for releasably connecting the apparatus 10 to the filter head 14, and means 32 for monitoring a fluid characteristic. The preferred means 32 for monitoring comprises a flowmeter, and for purposes of clarity in describing the preferred embodiments with reference to the drawing figures, will alternatively be referred to herein as flowmeter 32.

Flowmeter 32 preferably comprises a housing 36, having a first end 38, a second end 40, and one or more wall portions 42 extending between the first and second ends 38, 40. The first end 38 of the housing 36 is preferably attached to or integral with the coupling 30, and the second end 40 of the housing 36 is preferably attached to or integral with a floor portion 48, described in greater detail below. The housing comprises an internal surface 44 and an external surface 46, and preferably surrounds and defines an interior volume 50. The external geometry of the housing 36 preferably generally matches the external geometry of a hydraulic filter element of the type mounted on the filter head 14 in normal operation of the fluid circuit 12. In this manner, the flowmeter 32 can readily be installed and removed in place of the filter element, without interference from adjacent equipment. For example, a flowmeter 32 adapted for installation in place of a small automotive oil filter may have a generally cylindrical external geometry of approximately three inches in diameter and approximately four inches in length, whereas a flowmeter 32 adapted for installation in place of a large mobile equipment filter may have an external geometry of approximately six inches in diameter and approximately twelve inches in length. The external dimensions will, of course, vary with the application, and can be readily determined by measurement. One or more tool engaging features can be provided on the external surface 46 of the housing 36, if desired, to facilitate installation and removal. The housing 36 preferably comprises at least a portion that is transparent, whereby the interior volume 50 can be visually observed from an external position. In preferred form, the housing 36 is fabricated from a transparent plastic material such as acrylic tubing. A graduated scale 52 or other indicating feature or features can be provided on or in the housing 36, preferably adjacent a transparent portion of the housing 36, for indicating the position or other condition of components within the interior volume 50, as will be described in greater detail below.

Figure 3A:
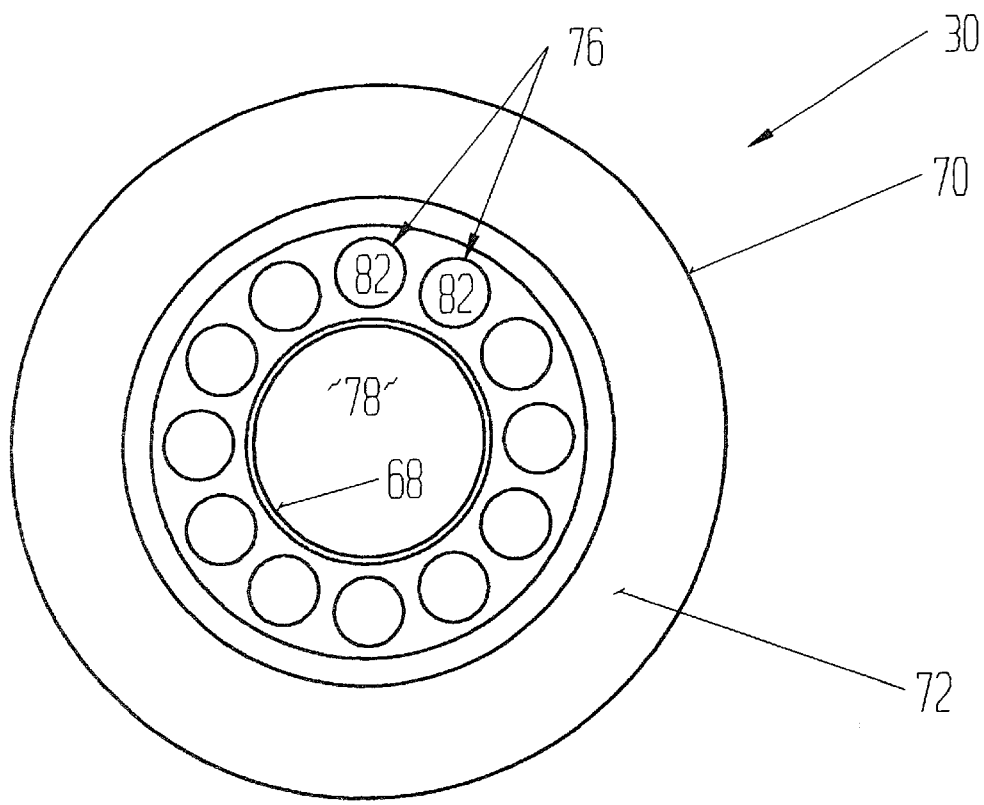
FIG. 3A shows a top view of a coupling portion of the apparatus of the present invention, according to a preferred form.
Figure 3B:
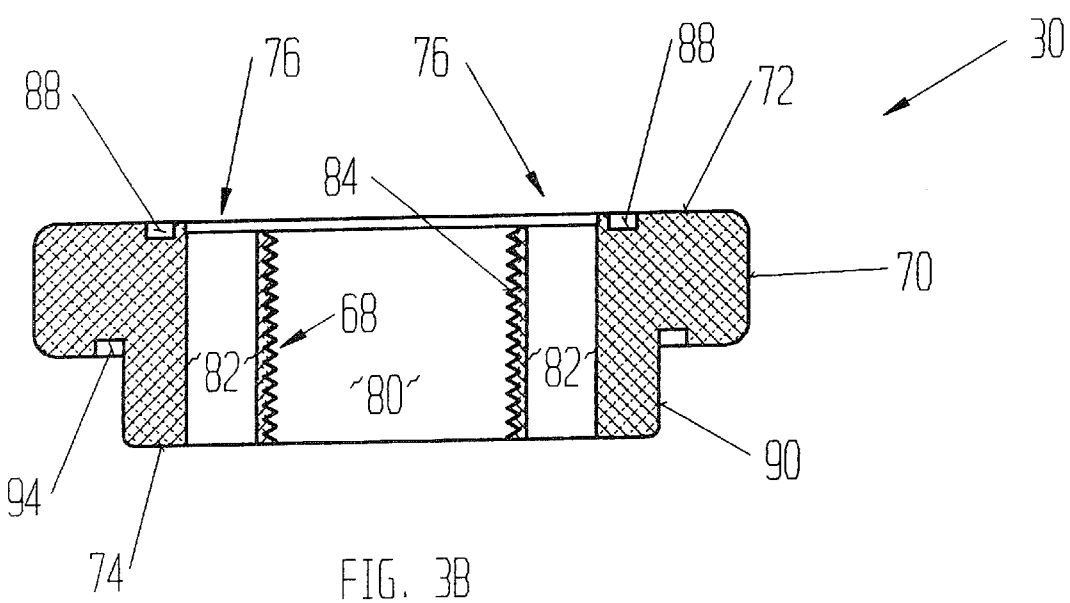
FIG. 3B shows a side view, in cross-section, of a coupling portion of the apparatus of the present invention, according to a preferred form.

As seen best in FIGS. 2, 3A and 3B, the coupling 30 detachably connects the flowmeter 32 to the filter head 14. The coupling 30 preferably comprises a generally annular body 66, having an inner circumferential face 68, an outer circumferential face 70, a top 72 and a bottom 74. The coupling 30 can be fabricated from aluminum, plastic, or other substantially rigid material. The coupling 30 preferably comprises an inlet 76 for receiving the fluid inflow 18 from the filter head 14, and communicating it to the interior volume 50 of the flowmeter 32, and an outlet 78 for discharging the fluid discharge 22 from the interior volume 50, and communicating it to the filter head 14. In the preferred embodiment depicted by the figures, the outlet 78 comprises a passage 80 defined by the inner face 68 of the annular body 66. The inlet 76 preferably comprises at least one bore 82 extending between the top 72 and the bottom 74 of the body 66. Preferably, a plurality of bores 82 are provided peripherally about the outlet 80, as shown in FIGS. 3A and 3B. Detachable coupling means for releasably connecting the flowmeter 32 to the filter head 14 are preferably provided. Preferably, the detachable coupling means comprise one or more connection elements capable of engaging corresponding connection elements provided on the filter head. For example, and as shown in FIG. 3B, the detachable coupling means comprise threads 84 provided on the inner face 68 of the annular body 66. The threads 84 are adapted to engage corresponding threads found on the outer circumferential face of the nipple 24 of the filter head 14. In this manner, the flowmeter 32 can be installed on and removed from the filter head 14 in the same manner as standard filter elements. Alternate detachable coupling means can comprise twist-lock connections, threaded connectors such as screw or bolts, clips, clamps, straps, or other releasable connection devices. The coupling 30 preferably further comprises sealing means for forming a seal against fluid passage between the flowmeter 32 and the filter head 14. The sealing means preferably comprises an O-ring 86 or a gasket provided between the top 72 of the coupling 30 and the filter head 14. The top 72 of the coupling 30 can be provided with a groove 88 or other surface feature for retaining the sealing means. If the coupling 66 and the housing 36 are formed as separate components, a similar sealing means can be provided for forming a seal against fluid passage therebetween. For example, as shown in FIG. 2, the outer face 70 of the annular body 66 of the coupling 30 can be provided with a reduced diameter shoulder portion 90 for engaging the wall portion 42 of the housing 36. A gasket or O-ring 92 and a retaining groove 94 therefor can also be provided.

Figure 4:
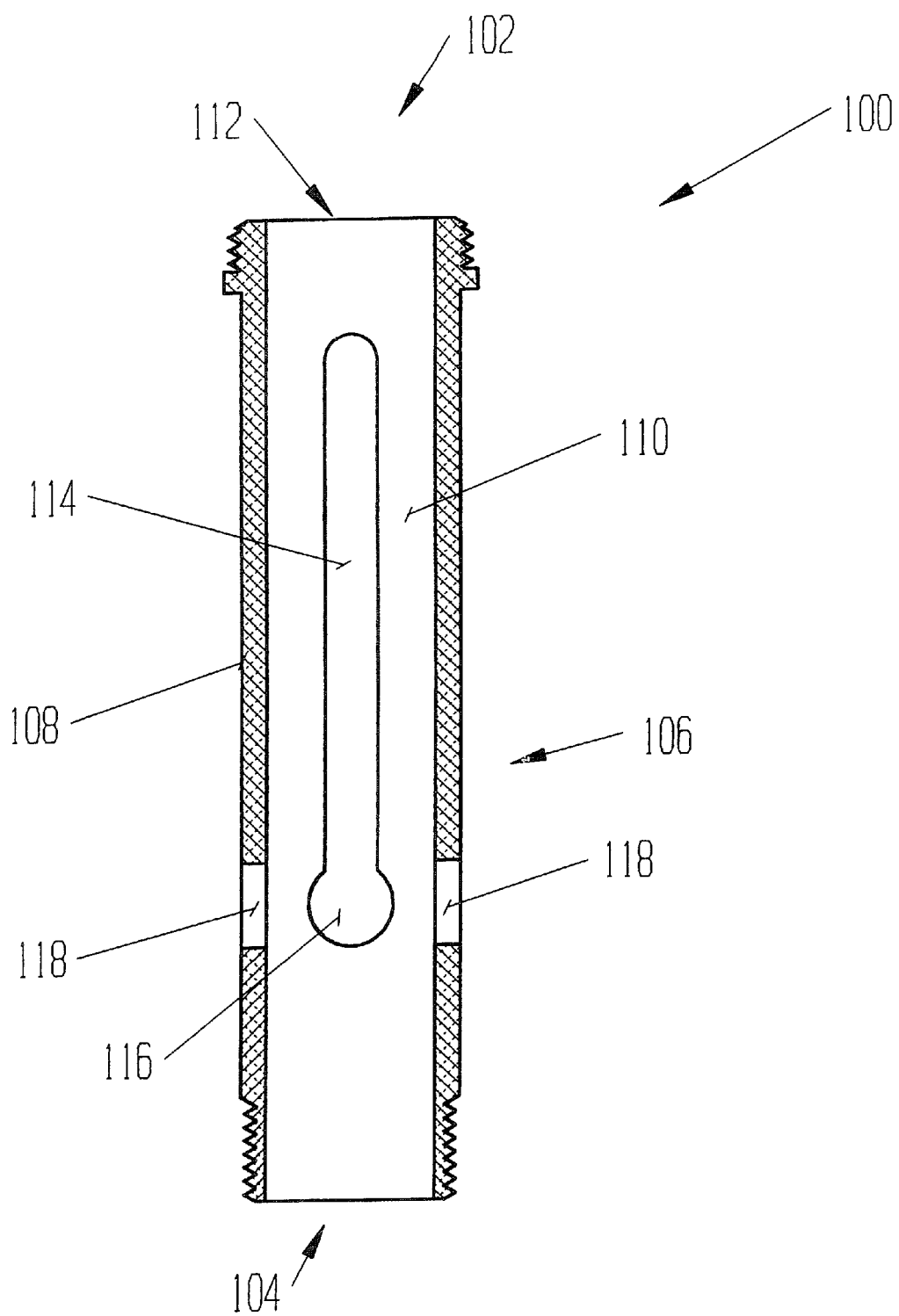
FIG. 4 shows a side view, in partial cross-section, of a fluid conduit portion of the apparatus of the present invention, according to a preferred form.

As shown best in FIGS. 2 and 4, the flowmeter 32 preferably further comprises a fluid conduit extending through at least a portion of the housing 36. In preferred form, the fluid conduit comprises a discharge tube 100, having a first end 102, a second end 104, and a body 106 having a length extending through at least a portion of the housing 36 between the first and second ends 102, 104. The discharge tube 100 preferably comprises a generally continuous and smooth outer surface 108, and an inner fluid passage 10 extending through at least a portion of the tube 100. The discharge tube 100 can be fabricated from aluminum, plastic, or other substantially rigid material. A first opening 112 is provided through the tube 100 at the first end 102, to permit fluid communication of the fluid discharge 22 from the fluid passage 110 to the outlet 78. A second opening 114 is preferably provided through the body 106 of the tube 100, and allowing fluid communication between the interior volume 50 of the housing 36 and the fluid passage 110. The second opening preferably comprises a slot extending lengthwise along the body 106 of the tube 100. In an alternate embodiment, a lengthwise array of multiple holes can be provided in place of the slot. The slot preferably has a substantially constant width along its length and, at its end distal the first end 102, terminates in an opening 116 having an expanded width. One or more holes 118 can be provided through the tube 100, circumferentially offset from the opening 116, to facilitate fluid communication between the interior volume 50 of the housing 36 and the fluid passage 110. In preferred form, the tube 100 extends generally axially through the center of the housing 36, having its first end 102 attached to the outlet 78 of the coupling 30, and its second end 104 attached to the floor 48 of the housing 36. Threaded connections or other releasable attachment means can be provided between the first and second ends 102, 104 of the tube 100, and the coupling 30 and floor 48.

Figure 5A:
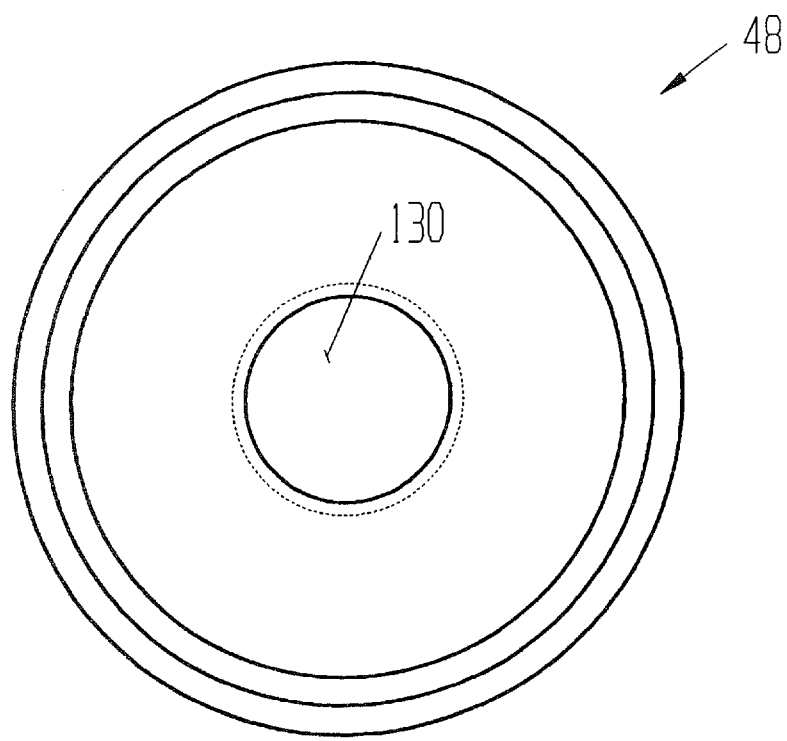
FIG. 5A shows a top view of a floor portion of the apparatus of the present invention, according to a preferred form.
Figure 5B:
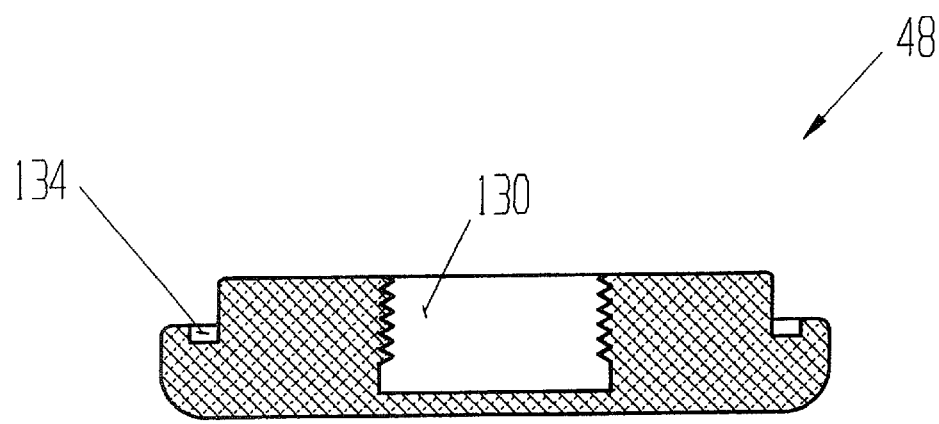
FIG. 5B shows a side view, in cross-section, of a floor portion of the apparatus of the present invention, according to a preferred form.

The floor 48 of the housing can be integrally formed with the wall portion 42, or can be separately fabricated and attached thereto to complete the housing. In the preferred embodiment depicted in the FIGS. 2, 5A and 5B, the floor 48 is a separate component. A threaded bore 130, or other releasable connection means, is preferably provided in or on the floor 48, for engaging threads or other corresponding releasable connection means provided on the second end 104 of the discharge tube 100. If the floor 48 and the wall portion 42 are separate components, sealing means such as an O-ring 132 or gasket can be provided therebetween for resisting fluid passage. A groove 134 or other retention means can be provided for retaining the sealing means in place.

The apparatus of the present invention further comprises monitoring means for monitoring a characteristic of fluid within the fluid circuit 12. In preferred form, the monitoring means comprise a flow indicator 140 for indicating a flowrate of the fluid within the fluid circuit 12. The flow indicator 140 preferably functions as a piston, movable within the housing 36 in response to the flow rate of fluid through the fluid circuit. As seen best in FIGS. 2, 6A and 6B, the flow indicator 140 preferably comprises a generally annular piston having an outer edge 144 confronting and sliding along the internal surface 44 of the housing 36, an inner edge 146 confronting and sliding along the outer surface 108 of the discharge tube 100, a top 148, and a bottom 150. Clearance spaces sufficient to permit fluid passage are preferably provided between the outer edge 144 of the flow indicator 140 and the internal surface 44 of the housing 36, and/or between the inner edge 146 of the flow indicator 140 and the outer surface 108 of the discharge tube 100.

Bias means, such as a spring 160, are preferably provided for resisting free movement of the flow indicator 140. As seen best in FIG. 2, the spring 160 preferably has a first end 162 connected to the floor portion 48 of the housing 36, a second end 164 connected to flow indicator, and an intermediate portion 166 coiled about the discharge tube 100. The size and stiffness of the spring will be selected depending upon the dimensions of the particular flowmeter, and the anticipated flowrates through a particular fluid circuit. Multiple interchangeable springs having different sniffinesses can be provided, to selectively vary the sensitivity of the flowmeter.

The above-described apparatus can be constructed by attaching the first end 102 of the discharge tube 100 to the outlet 78 of the coupling 30 by engaging the mating thread surfaces thereof. The O-ring 86 is installed into the groove 88 on the top 72 of the coupling body 66. The coupling 30 is mounted on the first end 38 of the housing 36, with the discharge tube 100 extending through the interior volume 50 of the housing 36. The flow indicator 140 is installed in the housing 36 over the discharge tube 100. The spring 160 is installed within the housing with its second end 164 in contact with the bottom 150 of the flow indicator 140, and with its intermediate portion 166 coiled about the discharge tube 100. The O-ring 132 is installed in the groove 134 in the floor 48. The floor 48 is attached to the second end 40 of the housing 36 by engaging the mating thread surfaces of the second end 104 of the discharge tube 100 and the threaded bore 130 of the floor portion 48. The O-rings or other sealing means between the wall portion 42 of the housing 36 and the coupling 30, and between the wall portion 42 of the housing 36 and the floor 48, can be engaged by twisting the coupling 30 relative to the floor 48 to further engage the threads of the discharge tube, and thereby contract the ends of the assembly towards one another to deform the O-rings 92, 132 into sealing contact with the respective abutting surfaces. The scale 52 or other indicia are applied to the housing by adhesive, by application of paint or dye, or by other application means.

The present invention further comprises a method of monitoring a characteristic of a fluid within a fluid circuit with a filter head, through the use of a fluid monitoring apparatus substantially as described above. If provided, valving adjacent the filter head is closed to prevent the escape of fluid from the fluid circuit. The filter element mounted on the filter head is removed by unscrewing or otherwise detaching the filter element according to standard removal techniques. The fluid monitoring apparatus is then connected to the filter head by engaging a coupling portion of the apparatus to the filter head. Typically, the connection will be accomplished by screwing a threaded portion of the coupling, such as the above-described threaded inner face of the coupling, onto a corresponding threaded portion of the filter head, such as the above-described threaded nipple of the filter head. The attachment of the monitoring apparatus onto the filter head is preferably carried out in substantially the same manner, and typically using the same tools, as standard installation techniques for the installation of a replacement filter onto the filter head. Any valving is returned to its operating configuration, and the fluid circuit is activated. The apparatus is observed to monitor the desired fluid characteristic. Upon completion of the desired monitoring task, the process is reversed to remove the monitoring apparatus and re-install the filter element.

In preferred form the present invention enables the measurement of a flowrate of the fluid within a fluid circuit. The position of the flow indicator 140 will vary depending on the flowrate through the fluid circuit. As seen best with reference to FIG. 2, the flow indicator 140 will typically be in its uppermost position, shown in solid lines, when there is no flow or minimal flow through the fluid circuit. As the flowrate is increased, the force imparted from fluid pressure above the flow indicator 140 will exceed the spring force and the force imparted from fluid pressure below the flow indicator 140, and will cause the flow indicator 140 to move downward against the force of the spring 160. As the flow indicator 140 moves downward, a progressively larger portion of the slotted second opening 114 in the discharge tube 100 is exposed to fluid flow therethrough, thus providing increased flowrate through the flowmeter. The lowermost extremity of the opening 116 at the bottom of the slotted second opening 114, and the holes 118, defines the point of maximum deflection of the flow indicator, thereby preventing overcompression of the spring 160. The position of the flow indicator 140 can be visually observed through the transparent portion of the housing 36, and compared to indexed positions on the scale 52 corresponding to known flowrates. Alternatively, the flow indicator can be magnetically, electrically, physically, or otherwise coupled to an external indicator, thereby permitting observation of the position of the flow indicator through a non-transparent housing.

While the invention has been described in its preferred forms, it will be readily apparent to those of ordinary skill in the art that many additions, modifications and deletions can be made thereto without departing from the spirit and scope of the invention.

What is claimed is:

1. An apparatus for measuring a fluid flowrate through a fluid circuit with a filter head, said apparatus comprising:
   (a) a housing comprising an internal surface defining an interior volume;
   (b) a coupling for connecting said housing to the filter head, and comprising an inlet for communicating a fluid inflow from a fluid circuit to said interior volume, and an outlet for communicating a fluid discharge from said interior volume to the fluid circuit;
   (c) a flow indicator movable within said housing in response to a fluid flowrate through the fluid circuit; and
   (d) a discharge tube having a first end connected to said outlet, a body having a length extending through at least a portion of said housing, an outer surface, an inner fluid passage extending through at least a portion of said tube and communicating with said outlet, and at least one opening through said body allowing fluid communication between said interior volume of said housing and said fluid passage;
       wherein said at least one opening comprises a slot extending along the length of said body, and wherein said flow indicator comprises a generally annular piston having an outer edge movable along said internal surface of said housing, and an inner edge movable along said outer surface of said tube.

2. An apparatus for measuring a fluid flowrate through a fluid circuit with a filter head, said apparatus comprising:

(a) a housing comprising an internal surface defining an interior volume;

(b) a coupling for connecting said housing to the filter head, and comprising an inlet for communicating a fluid inflow from a fluid circuit to said interior volume, and an outlet for communicating a fluid discharge from said interior volume to the fluid circuit; and (c) a flow indicator movable within said housing in response to a fluid flowrate through the fluid circuit;

wherein at least a portion of said housing is transparent, whereby a position of said flow indicator can be visually observed therethrough, and wherein said housing further comprises a calibrated scale adjacent said transparent portion of said housing.

3. An apparatus for indicating a rate of flow of a fluid through a fluid circuit, the fluid circuit including a filter head, a fluid supply to the filter head and a fluid discharge from the filter head, said apparatus comprising:

(a) a coupling adapted to releasably engage at least a portion of the filter head, said coupling comprising an inlet for receiving fluid from the fluid supply, and an outlet for discharging fluid to the fluid discharge;

(b) a housing comprising a first end, a second end, and at least one wall portion extending between said first and second ends, said first and second ends and said wall portion defining an interior volume, said first end being attached to said coupling, and said second end comprising a closed floor portion;

(c) a fluid conduit extending through at least a portion of said housing, and having a first opening in communication with said outlet and a second opening extending lengthwise along said fluid conduit; and (d) a flow indicator movable within said housing in response to the rate of flow of a fluid through the fluid circuit;

wherein said fluid conduit comprises a tube extending generally axially through said housing, and wherein said flow indicator is generally annular, having an inner face confronting said tube, and an outer face confronting said at least one wall portion of said housing.

4. The apparatus of claim 3, wherein said second opening comprises a slot extending lengthwise along said tube, whereby movement of said flow indicator in response to increasing flow rate exposes a progressively larger portion of said slot to fluid flow therethrought.

5. The apparatus of claim 3, further comprising a spring having a first end connected to said floor portion of said housing, a second end connected to said flow indicator, and an intermediate portion coiled about said tube.

6. The apparatus of claim 3, wherein said tube has a first end attached to said coupling adjacent said outlet, and a second end attached to said floor portion of said housing.

7. An apparatus for indicating a rate of flow of a fluid through a fluid circuit, the fluid circuit including a filter head, a fluid supply to the filter head and a fluid discharge from the filter head, said apparatus comprising:

(a) a coupling adapted to releasably engage at least a portion of the filter head, said coupling comprising an inlet for receiving fluid from the fluid supply, and an outlet for discharging fluid to the fluid discharge;

(b) a housing comprising a first end, a second end, and at least one wall portion extending between said first and second ends, said first and second ends and said wall portion defining an interior volume, said first end being attached to said coupling, and said second end comprising a closed floor portion;

(c) a fluid conduit extending through at least a portion of said housing, and having a first opening in communication with said outlet and a second opening extending lengthwise along said fluid conduit; and (d) a flow indicator movable within said housing in response to the rate of flow of a fluid through the fluid circuit;

wherein at least a portion of said housing is transparent, whereby a position of said flow indicator can be visually observed therethrough, and wherein said housing further comprises a calibrated scale adjacent said transparent portion of said housing.

8. An apparatus for measuring a fluid flowrate through a fluid circuit, said apparatus comprising:

(a) a housing comprising a first end, a second end, and a wall portion extending between said first and second ends, and defining an interior volume therein;

(b) coupling means for coupling said housing to a filter head within the fluid circuit;

(c) an inlet communicating a fluid inflow to said interior volume;

(d) an outlet communicating a fluid discharge from said interior volume;

(e) a fluid conduit having a first opening in communication with said outlet, and a second opening in communication with said interior volume;

(f) a flow indicator movable within said interior volume in response to a fluid flowrate, whereby movement of said flow indicator in response to increasing flow rate exposes a progressively larger portion of said second opening to fluid flow therethrough.

9. The apparatus of claim 8, wherein said housing comprises a generally cylindrical external geometry, generally matching the external geometry of a hydraulic filter of the type mountable upon the filter head.

* * * * *